US009621831B2

(12) United States Patent
Inui et al.

(10) Patent No.: US 9,621,831 B2
(45) Date of Patent: Apr. 11, 2017

(54) METHOD FOR DRIVING IMAGE CAPTURE DEVICE, IMAGE CAPTURE DEVICE, AND IMAGE CAPTURE SYSTEM

(71) Applicant: CANON KABUSHIKI KAISHA, Tokyo (JP)

(72) Inventors: Fumihiro Inui, Yokohama (JP); Yasuharu Ota, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/973,320

(22) Filed: Dec. 17, 2015

(65) Prior Publication Data

US 2016/0191832 A1 Jun. 30, 2016

(30) Foreign Application Priority Data

Dec. 26, 2014 (WO) .................. PCT/JP2014/084603

(51) Int. Cl.
| | |
|---|---|
| H04N 5/369 | (2011.01) |
| H04N 5/374 | (2011.01) |
| H04N 5/378 | (2011.01) |
| H04N 5/232 | (2006.01) |
| H04N 5/3745 | (2011.01) |

(52) U.S. Cl.
CPC ....... *H04N 5/3745* (2013.01); *H04N 5/23212* (2013.01); *H04N 5/3696* (2013.01); *H04N 5/37457* (2013.01)

(58) Field of Classification Search
CPC ............. H04N 5/3745; H04N 5/37457; H04N 5/3696; H04N 5/23212; H04N 5/378
USPC ........ 348/308, 300, 302, 294, 572; 341/126, 341/155, 172; 250/208.1
See application file for complete search history.

(56) References Cited

U.S. PATENT DOCUMENTS

2010/0013969 A1\* 1/2010 Ui ...................... H04N 5/35545
348/294
2012/0305750 A1\* 12/2012 Barbier .................. H04N 5/335
250/208.1

(Continued)

FOREIGN PATENT DOCUMENTS

| JP | 2011060815 A | 3/2011 |
|---|---|---|
| JP | 2013106194 A | 5/2013 |
| JP | 2013211833 A | 10/2013 |

*Primary Examiner* — Tuan Ho
*Assistant Examiner* — Marly Camargo
(74) *Attorney, Agent, or Firm* — Canon USA, Inc. IP Division

(57) ABSTRACT

An image capture device includes multiple pixels, each of which has multiple photoelectric conversion elements. Each of first pixels which are some of the pixels outputs a signal based on charges obtained by adding together the charges generated in the photoelectric conversion elements. Each of second pixels outputs a signal based on charges generated by a photoelectric conversion element disposed at a first position, without outputting charges generated by a photoelectric conversion element disposed at a second position among the photoelectric conversion elements. Each of third pixels outputs a signal based on charges generated by the photoelectric conversion element disposed at the second position, without outputting a signal based on charges generated by the photoelectric conversion element disposed at the first position.

20 Claims, 11 Drawing Sheets

(56) References Cited

U.S. PATENT DOCUMENTS

| | | | |
|---|---|---|---|
| 2013/0113966 A1* | 5/2013 | Arishima | H04N 5/378 348/301 |
| 2013/0120624 A1* | 5/2013 | Okita | H04N 5/335 348/300 |
| 2013/0229555 A1* | 9/2013 | Hashimoto | H04N 5/378 348/300 |
| 2014/0036121 A1* | 2/2014 | Minowa | H04N 5/378 348/301 |
| 2014/0253771 A1* | 9/2014 | Okita | H04N 5/335 348/300 |
| 2015/0029375 A1* | 1/2015 | Sugawa | H04N 5/3575 348/308 |
| 2015/0029376 A1* | 1/2015 | Sugawa | H04N 5/378 348/308 |

* cited by examiner

9,621,831 B2

METHOD FOR DRIVING IMAGE CAPTURE DEVICE, IMAGE CAPTURE DEVICE, AND IMAGE CAPTURE SYSTEM

TECHNICAL FIELD

The present invention relates to a method for driving an image capture device, the image capture device, and an image capture system.

BACKGROUND ART

A known image capture device detects focus on the image capture surface by using a pupil division method. PTL 1 describes a pixel which has multiple photoelectric conversion elements, each of which generates a charge based on incident light, and an amplifier unit which receives the charge in the photoelectric conversion elements and which outputs signals based on the charge to a common output line. The amplifier unit outputs a signal based on the charge in at least one of the photoelectric conversion elements to the common output line. After that, the amplifier unit outputs a signal based on the charge in the photoelectric conversion elements to the common output line.

PTL 2 describes an image capture device which detects focus on the image capture surface by using a pupil division method and in which the number of output signals for focus detection is less than that of output signals for image capture.

PTL 3 describes an image capture device in which a photodiode is formed in a first area of the light-receiving surface of a focus detection pixel and in which a discharge region is formed in a second area of the light-receiving surface. The image capture device described in PTL 3 has the photodiode and the discharge region whose structure is different from that of the photodiode. The image capture device described in PTL 3 sets the potential of the discharge region differently from that of the photodiode in order to absorb a charge generated between the photodiode and the discharge region into the discharge region.

CITATION LIST

Patent Literature

PTL 1: Japanese Patent Laid-Open No. 2013-106194
PTL 2: Japanese Patent Laid-Open No. 2013-211833
PTL 3: Japanese Patent Laid-Open No. 2011-60815

SUMMARY OF INVENTION

According to an aspect, there is provided a method for driving an image capture device including a plurality of pixels. Each of the plurality of pixels includes a microlens and a plurality of photoelectric conversion elements. The plurality of photoelectric conversion elements generate respective charges based on light passing through the microlens, and are disposed at a first position and a second position with respect to the microlens in such a manner as to receive light passing through different respective pupils in an optical system. The pupils are different from each other. The method includes supplying a common voltage to the plurality of photoelectric conversion elements such that the plurality of photoelectric conversion elements are depleted; in one vertical scanning period in which rows in which the plurality of pixels are arranged are vertically scanned, by using a first pixel, outputting a signal based on charges obtained by adding together the charges generated by the plurality of photoelectric conversion elements; by using a second pixel, outputting a signal based on charges generated by the photoelectric conversion element disposed at the first position among the plurality of photoelectric conversion elements, without outputting a signal based on charges generated by the photoelectric conversion element disposed at the second position among the plurality of photoelectric conversion elements; and, by using a third pixel, outputting a signal based on charges generated by the photoelectric conversion element disposed at the second position among the plurality of photoelectric conversion elements, without outputting a signal based on charges generated by the photoelectric conversion element disposed at the first position among the plurality of photoelectric conversion elements.

According to another aspect, there is provided an image capture device including a plurality of pixels. Each of the plurality of pixels includes a microlens and a plurality of photoelectric conversion elements. The plurality of photoelectric conversion elements generate respective charges based on light passing through the microlens and are disposed at a first position and a second position with respect to the microlens in such a manner as to receive light passing through respective pupils in an optical system. The pupils are different from each other. A common voltage is supplied to the plurality of photoelectric conversion elements in each of the plurality of pixels such that the plurality of photoelectric conversion elements are depleted. A first pixel outputs a signal based on charges obtained by adding together the charges generated by the plurality of photoelectric conversion elements. A second pixel outputs a signal based on charges generated by the photoelectric conversion element disposed at the first position among the plurality of photoelectric conversion elements, without outputting a signal based on charges generated by the photoelectric conversion element disposed at the second position among the plurality of photoelectric conversion elements. In one vertical scanning period in which rows in which the plurality of pixels are arranged are vertically scanned, a third pixel outputs a signal based on charges generated by the photoelectric conversion element disposed at the second position among the plurality of photoelectric conversion elements, without outputting a signal based on charges generated by the photoelectric conversion element disposed at the first position among the plurality of photoelectric conversion elements.

Further features of the present invention will become apparent from the following description of exemplary embodiments with reference to the attached drawings.

DESCRIPTION OF EMBODIMENTS

Figure 1A:
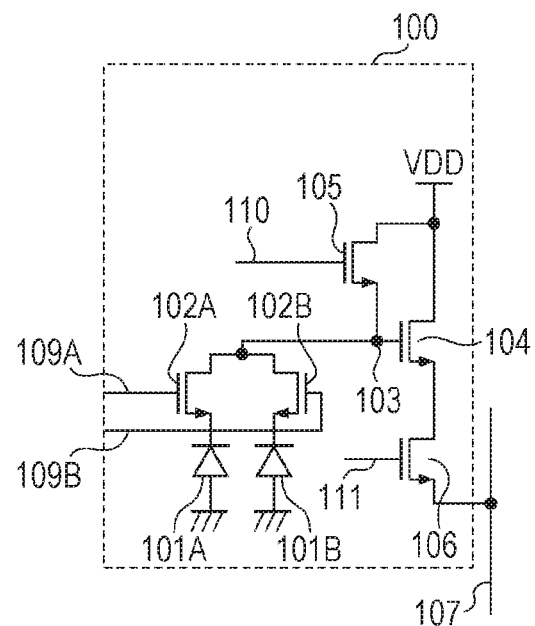
FIG. 1A includes a diagram illustrating an exemplary pixel.

The image capture devices described in PTL 1 and PTL 2 are devised in insufficient consideration of achieving high-speed processing.

In the image capture device described in PTL 3, since the discharge region has a structure different from that of the photodiode, the potential of the discharge region is to be set in such a manner that compatibility is achieved between suppression of a reduction in accuracy of focus detection and absorption of a charge generated between the photodiode and the discharge region.

Embodiments described below relate to a technique in which higher-speed processing is achieved while a reduction in accuracy of focus detection is suppressed by using a simpler method.

An image capture device provided by the present invention will be described below by referring to the drawings. The description below will be made on the basis of the case in which transistors included in a pixel are re-channel MOS transistors. The present invention may be applied also to the case in which transistors included in a pixel are p-channel MOS transistors. In this case, the voltages applied to the source, the drain, and the gate of a MOS transistor may be changed as appropriate from those described in the embodiments described below.

First Embodiment

FIG. 1A is a diagram illustrating a circuit for one pixel 100 in an image capture device according to the present embodiment. One pixel 100 includes a photoelectric conversion element 101A, a photoelectric conversion element 101B, a transfer transistor 102A, a transfer transistor 102B, a reset transistor 105, an amplifier transistor 104, and a selection transistor 106. The amplifier transistor 104 is an amplifier unit which outputs a signal based on the charge generated by the photoelectric conversion element 101. A signal is input to the gate of the transfer transistor 102A from a vertical scan circuit via a transfer control line 109A. A signal is input to the gate of the transfer transistor 102B from the vertical scan circuit via a transfer control line 109B. The transfer transistor 102A is electrically connected to the photoelectric conversion element 101A. The transfer transistor 102B is electrically connected to the photoelectric conversion element 101B. The transfer transistor 102A, the transfer transistor 102B, and the reset transistor 105 are electrically connected to a node 103. A signal is input to the gate of the reset transistor 105 from the vertical scan circuit via a reset control line 110. Each of the reset transistor 105 and the amplifier transistor 104 is supplied with a power supply voltage VDD. The node 103 is an input node of the amplifier transistor 104. The amplifier transistor 104 is electrically connected to a common output line 107 via the selection transistor 106. A signal is input to the gate of the selection transistor 106 from the vertical scan circuit via a selection control line 111.

Figure 1B:
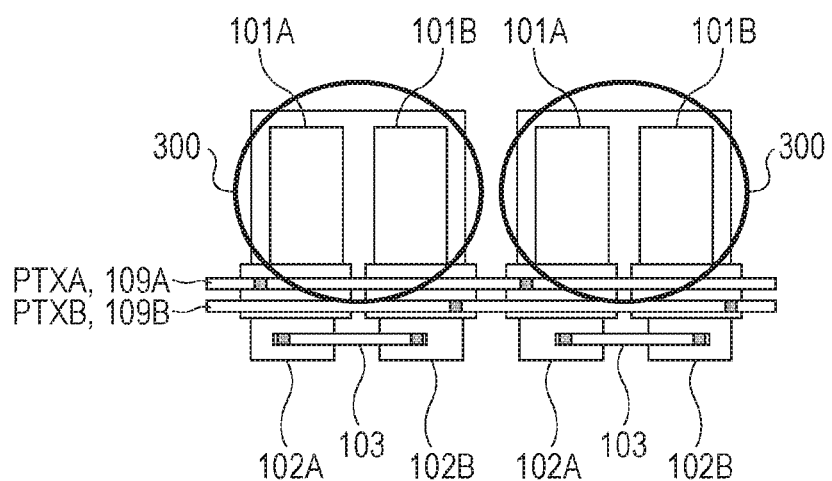
FIG. 1B includes a plan view of pixels.

FIG. 1B illustrates multiple pixels arranged in the same line. Each of the multiple pixels has the same circuit as that of the pixel illustrated in FIG. 1A. FIG. 1B illustrates the photoelectric conversion element 101A, the photoelectric conversion element 101B, the transfer transistor 102A, the transfer transistor 102B, and the node 103 among the components illustrated in FIG. 1A. Each of the multiple pixels has a single microlens 300. Each of the photoelectric conversion element 101A and the photoelectric conversion element 101B generates a charge based on light passing through the microlens 300. The photoelectric conversion element 101A is located in a left portion of the microlens 300 when the pixel is viewed in plan. The photoelectric conversion element 101B is located in a right portion of the microlens 300 when the pixel is viewed in plan. Thus, the photoelectric conversion element 101A is disposed at a first position of the microlens 300, and the photoelectric conversion element 101B is disposed at a second position of the microlens 300. That is, the photoelectric conversion element 101A and the photoelectric conversion element 101B are disposed at positions so that the photoelectric conversion element 101A receives light passing through a region of a pupil of an optical system and the photoelectric conversion element 101B receives light passing through a different region of the pupil. The photoelectric conversion element 101A and the photoelectric conversion element 101B have the same PN structure. The same PN structure is a structure which causes the photoelectric conversion element 101A and the photoelectric conversion element 101B to have depletion voltages which are equal to each other. Specifically, for example, it is a structure in which the photoelectric conversion element 101A and the photoelectric conversion element 101B have the same impurity concentration and have the same cross-section structure. In addition, a voltage common in the photoelectric conversion element 101A and the photoelectric conversion element 101B is supplied to each of the PN junction of the photoelectric conversion element 101A and that of the photoelectric conversion element 101B so that both of the PN junctions become depleted.

In the image capture device according to the present embodiment, multiple pixels illustrated in FIG. 1B are arranged in each of multiple rows.

Figure 2:
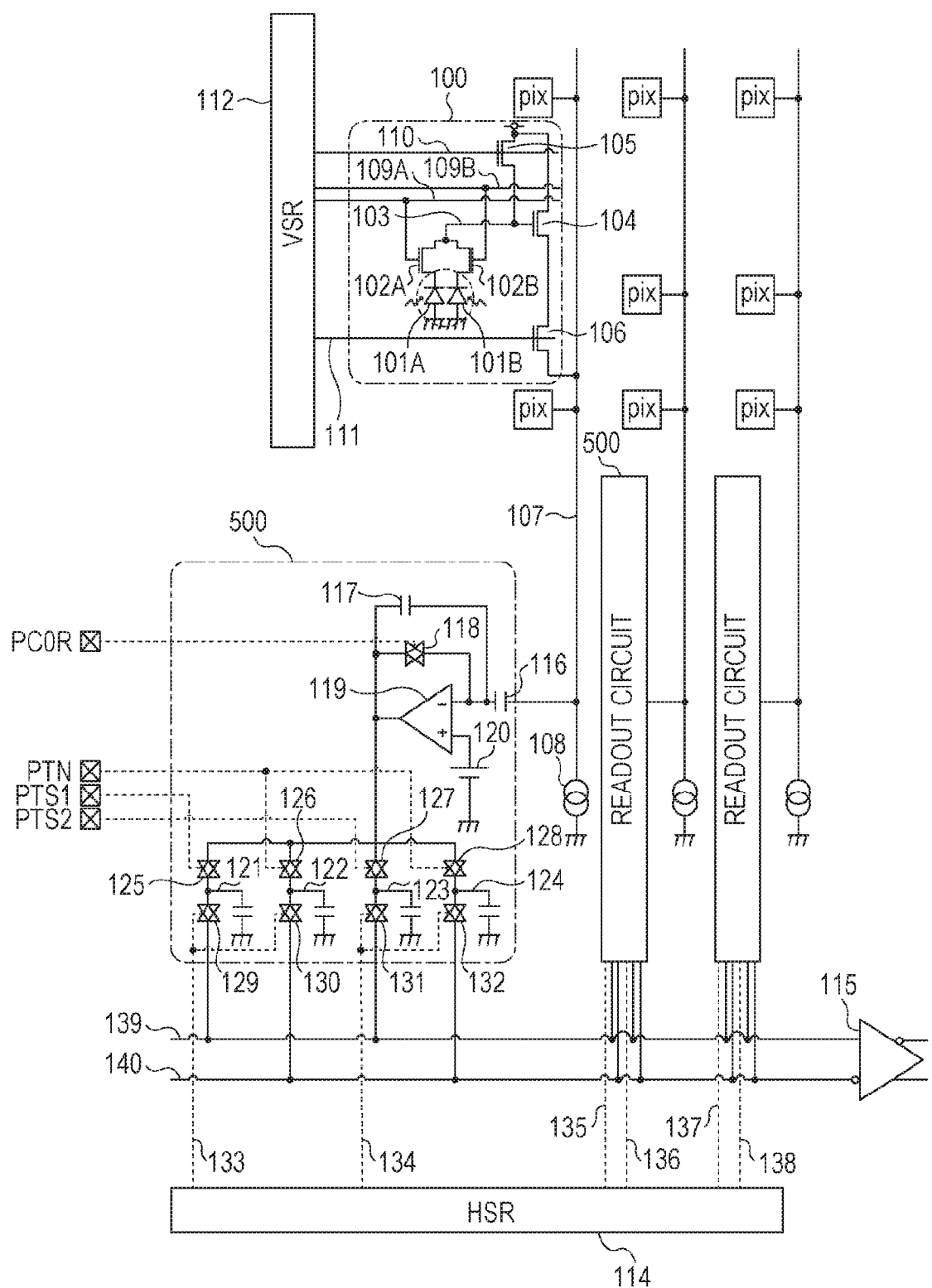
FIG. 2 is a diagram illustrating an exemplary configuration of an image capture device.

FIG. 2 is an overall view of the image capture device having the pixel 100 illustrated in FIGS. 1A and 1B. In FIG. 2, components having the same functions as those illustrated in FIG. 1A are designated with the same reference numerals as those in FIG. 1A. Pixels 100 are arranged in a matrix.

The common output line 107 is electrically connected to a current source 108. The current source 108 supplies a bias current to the amplifier transistor 104, and the amplifier transistor 104 and the current source 108 form a source follower.

The transfer control line 109A, the transfer control line 109B, the reset control line 110, and the selection control line 111 are connected to the gate of the transfer transistor 102A, that of the transfer transistor 102B, that of the reset transistor 105, and that of the selection transistor 106, respectively. Each gate is supplied with a drive pulse from a vertical scan circuit 112 row by row sequentially or randomly.

A readout circuit 500 receives a signal from the common output line 107. The readout circuit 500 is connected to the common output line directly or via a switch. A signal which has been processed by the readout circuit 500 is sequentially output by a horizontal scan circuit 114 to an output amplifier 115, and is output to the outside.

A main operation of the readout circuit 500 is an operation of inversely amplifying a signal from the common output line 107 with a gain determined with the capacitance value of an input capacitor 116 and that of a feedback capacitor 117. Further, the readout circuit 500 may also perform a virtual ground operation, and may perform a CDS (correlated double sampling) operation through a clamping operation using the input capacitor 116.

An exemplary specific circuit of the readout circuit 500 will be described. A first node of the input capacitor 116 is electrically connected to the common output line 107, and a second node is electrically connected to the inverting input node of an operational amplifier 119. A first node of the feedback capacitor 117 is electrically connected to the inverting input node of the operational amplifier 119 and the second node of the input capacitor. A second node of the feedback capacitor 117 is electrically connected to the output node of the operational amplifier 119.

A switch 118 is disposed in a feedback path between the inverting input node and the output node of the operational amplifier 119 in order to control an electrical connection between the inverting input node and the output node. The feedback capacitor 117 and the switch 118 are disposed in parallel with each other.

A power supply 120 supplies a reference voltage Vref to the non-inverting input node of the operational amplifier 119. Holding capacitors 121 to 124 are capacitors for retaining output from the operational amplifier 119. Switches 125 to 128 which are disposed in electric routes between the holding capacitors 121 to 124 and the operational amplifier 119 control electrical conduction between the output node of the operational amplifier 119 and the holding capacitors 121 to 124. Switches 129 to 132 receive signals from the horizontal scan circuit 114, and output signals retained in the holding capacitors 121 to 124 to horizontal output lines 139 and 140. The output amplifier 115 obtains a difference between signals which are output to the horizontal output lines 139 and 140 and outputs the result to the outside.

A drive pulse PCOR is supplied to the switch 118. A drive pulse PTN is supplied to the switches 126 and 128. A drive pulse PTS1 is supplied to the switch 125. A drive pulse PTS2 is supplied to the switch 127.

Figure 3A:
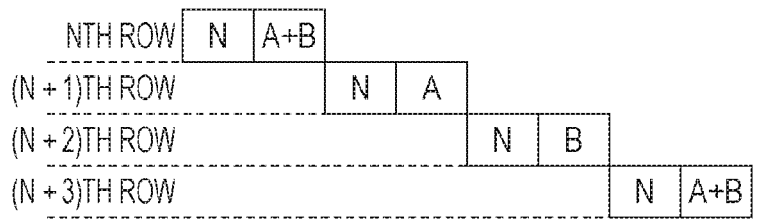
FIG. 3A includes a diagram illustrating exemplary operations of the image capture device.
Figure 3B:
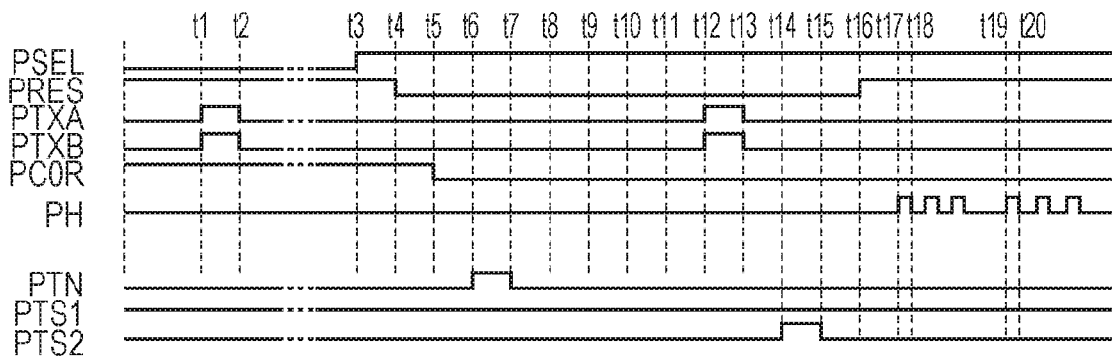
FIG. 3B includes a diagram illustrating exemplary operations of the image capture device.

FIGS. 3A and 3B are diagrams illustrating an operation of the image capture device illustrated in FIG. 2. FIG. 3A illustrates signals which are read from pixels 100 in four rows. The symbol N represents a noise signal, and the symbol A represents a signal based on the charge in the photoelectric conversion element 101A. The symbol B represents a signal based on the charge in the photoelectric conversion element 101B, and the symbol (A+B) represents a signal based on the charge obtained by adding the charge in the photoelectric conversion element 101A to that in the photoelectric conversion element 101B. A pixel 100 in the Nth row outputs an N signal and an (A+B) signal. A pixel 100 in the (N+1)th row outputs an N signal and an A signal. A pixel 100 in the (N+2)th row outputs an N signal and a B signal. A pixel in the (N+3)th row outputs an N signal and an (A+B) signal.

Figure 3C:
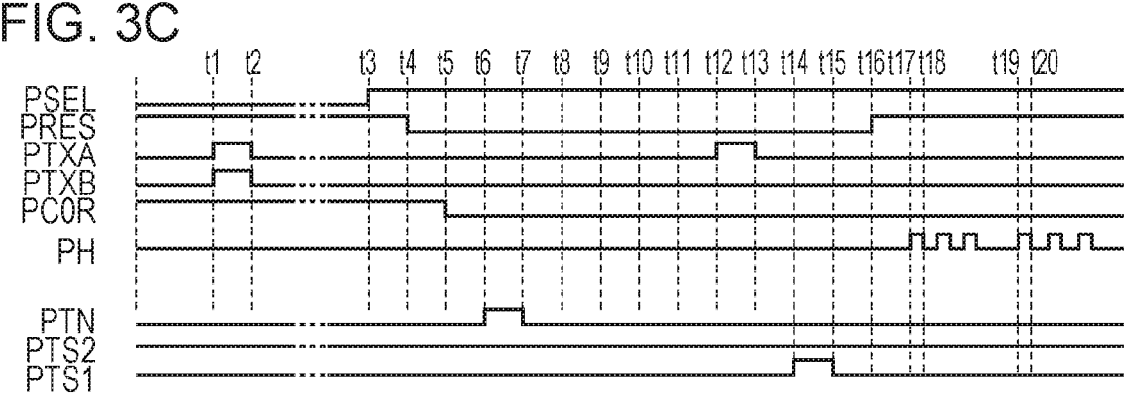
FIG. 3C includes a diagram illustrating exemplary operations of the image capture device.
Figure 3D:
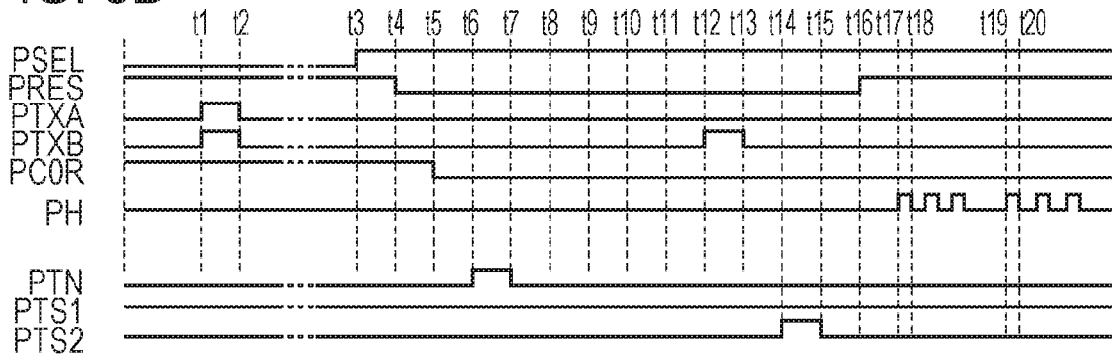
FIG. 3D includes a diagram illustrating exemplary operations of the image capture device.

FIG. 3B is a diagram illustrating an operation of each of the pixels 100 in Nth row and the (N+3)th row. FIG. 3C is a diagram illustrating an operation of the pixel 100 in the (N+1)th row. FIG. 3D is a diagram illustrating an operation of the pixel 100 in the (N+2)th row.

In FIGS. 3B, 3C, and 3D, each signal causes a transistor or a switch to go into the conductive state, when the signal is set to the high level. FIGS. 3B, 3C, and 3D illustrate operations of pixels disposed in respective rows different from one another. In one vertical scanning period which is a period in which the vertical scan circuit vertically scans multiple pixels at a time, there are pixel rows on which the operation in FIG. 3B is performed, pixel rows on which the operation in FIG. 3C is performed, and pixel rows on which the operation in FIG. 3D is performed.

Signals illustrated in each of FIGS. 3B, 3C, and 3D will be described. The symbol PSEL represents a signal which is input to the selection transistor 106 from the vertical scan circuit via the selection control line 111. The symbol PRES represents a signal which is input to the reset transistor 105 from the vertical scan circuit via the reset control line 110. The symbols PTXA and PTXB represent signals which are input to the transfer transistor 102A and the transfer transistor 102B from the vertical scan circuit via the transfer control line 109A and the transfer control line 109B, respectively.

The operation in FIG. 3B will be described. The operation illustrated in FIG. 3B is an operation in which a pixel 100 outputs a noise signal and a signal based on the charge obtained by adding the charge generated by the photoelectric conversion element 101A to the charge generated by the photoelectric conversion element 101B, to the common output line 107.

At time T=t1, the drive pulses PTXA and PTXB supplied to the transfer control lines 109A and 109B are set to the high level. At that time, since the drive pulse PRES supplied to the reset control line 110 is at the high level, the photoelectric conversion elements 101A and 101B are reset.

At T=t2, the drive pulses PTXA and PTXB are set to the low level. At this timing, a charge accumulation period starts in the photoelectric conversion elements 101A and 101B. The drive pulse PRES is kept at the high level. Therefore, the reset operation continues in the input node 103 of the amplifier transistor 104.

After accumulation is performed for a predetermined period, sequential readout operations of signals to the common output line 107 are performed for each row or for every multiple rows.

At time T=t3, the drive pulse PSEL supplied to the selection control line 111 of the selection transistor 106 is set to the high level, and the selection transistor 106 is made conductive. Thus, a signal according to the potential of the input node of the amplifier transistor 104 is output to the common output line 107.

At time T=t4, the drive pulse PRES supplied to the reset control line 110 of the reset transistor 105 is set to the low level, whereby the reset operation of the input node 103 of the amplifier transistor 104 is canceled. Then, the reset signal level is read to the common output line 107, and is input to the readout circuit 500. At that time, the operational amplifier 119 is in the virtual ground state. Specifically, the drive pulse PCOR is at the high level, and the switch 118 is in the conductive state. The operational amplifier 119 is in a state in which output of Vref is buffered, and the reset signal level is supplied to the input capacitor 116 in this state.

At T=t5, the drive pulse PCOR is set to the low level. At T=t6, the drive pulse PTN is switched from the low level to the high level, and the switches 126 and 128 go into the conductive state. At T=t7, the drive pulse PTN is switched from the high level to the low level, and the switches 126 and 128 go into the non-conductive state. This operation causes output of about Vref to be supplied to the holding capacitors 122 and 124. Then, the holding capacitors 122 and 124 and the output node of the operational amplifier 119 go into the non-conductive state.

Subsequently, at T=t12, the drive pulse PTXA is set to the high level, and the drive pulse PTXB is set to the high level in at least a part of the period in which the drive pulse PTXA is at the high level. This operation enables both of the photoelectric charge in the photoelectric conversion element 101A and that in the photoelectric conversion element 101B to be transferred to the input node 103 at the same time. This operation enables a signal for image formation to be generated in the common output line 107.

The following expression is obtained:

$$V(A+B)=V\text{ref}+\Delta Va+b\times(-C0/Cf) \quad \text{Expression(1)}$$

where a potential change in the common output line 107 is represented by $\Delta Va+b$ (negative), and the output potential of the operational amplifier 119 is represented by $V(A+B)$.

At T=t14, the drive pulse PTS2 is switched from the low level to the high level, and the switch 127 is made conductive. At T=t15, the drive pulse PTS2 is switched from the high level to the low level, and the switch 127 is made non-conductive. This operation enables the potential $V(A+B)$ of the output node of the operational amplifier 119 to be written in the holding capacitor 123.

Then, the difference voltage between capacitances CTSAB and CTN is obtained:

$$V(A+B)-V\text{ref}=\Delta Va+b\times(-C0/Cf) \quad \text{Expression(2)}$$

This corresponds to a value obtained by adding together signals from two photoelectric conversion elements included in a photoelectric conversion unit. A signal corresponding to one pixel used when an image is captured by using multiple photoelectric conversion elements included in the photoelectric conversion unit is obtained.

At T=t16, the drive pulse PRES is set to the high level, the reset transistor 105 is made conductive, and the potential of the input node 103 is reset.

The operation illustrated in FIG. 3C will be described. The differences between the operation in FIG. 3B and that in FIG. 3C will be mainly described below. The operation illustrated in FIG. 3C is an operation in which a pixel 100 outputs a noise signal and a signal based on the charge in the photoelectric conversion element 101A.

At T=t12, the drive pulse PTXA is set to the high level, and the photoelectric charge in the photoelectric conversion element 101A is transferred to the input node 103 of the amplifier transistor 104. At T=t13, the drive pulse PTXA is set to the low level. This operation causes the photoelectric charge in the photoelectric conversion element 101A to be transferred to the input node 103. Thus, a signal based on the photoelectric charge is supplied to the readout circuit 500 via the amplifier transistor 104 and the common output line 107. This operation enables a signal for focus detection to be generated in the common output line.

In the readout circuit 500, a value obtained by multiplying the voltage change by the inverted gain of a ratio of the capacitance value C0 of the input capacitor 116 to the capacitance value Cf of the feedback capacitor 117 is output. Specifically, the following expression is obtained:

$$V(A)=V\text{ref}+\Delta Va\times(-C0/Cf) \quad \text{Expression(3)}$$

where the voltage change in the common output line 107 is represented by $\Delta Va$ (negative), and the output of the operational amplifier 119 is represented by $V(A)$.

At T=t14, the drive pulse PTS1 is switched from the low level to the high level, and the switch 125 is made conductive. At T=t15, the drive pulse PTS1 is switched from the high level to the low level, and the switch 125 is made non-conductive. This operation enables the potential $V(A)$ of the output node of the operational amplifier 119 to be written in the holding capacitor 121.

The operation illustrated in FIG. 3D will be described. The differences between the operation in FIG. 3B and that in FIG. 3D will be mainly described below. The operation illustrated in FIG. 3D is an operation in which a pixel 100 outputs a noise signal and a signal based on the charge in the photoelectric conversion element 101B.

At time T=t12, the drive pulse PTXB is set to the high level, and the photoelectric charge in the photoelectric conversion element 101B is transferred to the input node 103 of the amplifier transistor 104. At T=t13, the drive pulse PTXB is set to the low level. This operation causes the photoelectric charge in the photoelectric conversion element 101B to be transferred to the input node 103. Thus, a signal based on the photoelectric charge is supplied to the readout circuit 500 via the amplifier transistor 104 and the common output line 107. This operation enables a signal for focus detection to be generated in the common output line.

In the readout circuit 500, a value obtained by multiplying the voltage change by the inverted gain of a ratio of the capacitance value C0 of the input capacitor 116 to the capacitance value Cf of the feedback capacitor 117 is output. Specifically, the following expression is obtained:

$$V(B)=V\text{ref}+\Delta Vb\times(-C0/Cf) \quad \text{Expression(4)}$$

where the voltage change in the common output line 107 is represented by $\Delta Vb$ (negative), and the output of the operational amplifier 119 is represented by $V(B)$.

Signals retained in the holding capacitors 121 to 124 are read out in such a manner that drive pulses 133 and 134 in synchronization with a pulse PH are sequentially set to the high level after T=t17. According to the present embodiment, the output amplifier 115 which is capable of performing difference processing is disposed downstream of the horizontal output lines 139 and 140. Therefore, the difference between the signals retained in the holding capacitors 121 and 122 may be output to the outside of the image capture device. Further, the difference between the signals retained in the holding capacitors 123 and 124 may be output to the outside of the image capture device. This may reduce noise generated in the horizontal output lines 139 and 140. However, the output amplifier 115 need not necessarily have a configuration for obtaining difference output, and may be simply a buffer stage. After that, signals in the columns are sequentially scanned by the horizontal scan circuit 114, and are read out to the horizontal output lines 139 and 140.

Thus, as illustrated in FIG. 3B, in the image capture device according to the present embodiment, each of first pixels which are some of multiple pixels outputs a signal based on the charge obtained by adding together the charge in multiple photoelectric conversion elements. As illustrated in FIG. 3C, each of second pixels which are some of the pixels other than the first pixels outputs a signal based on the charge of a photoelectric conversion element which is disposed at a first position and which is a photoelectric conversion element among the multiple photoelectric conversion elements. As illustrated in FIG. 3D, each of third pixels which are different from the first pixels and the second pixels among the pixels outputs a signal based on the charge in a photoelectric conversion element which is disposed at a second position and which is a photoelectric conversion element among the multiple photoelectric conversion elements.

The first pixel outputs a signal for image formation. The second pixel and the third pixel output signals for focus detection.

Thus, in comparison with the case in which each of all the pixels 100 outputs a signal for image formation and a signal for focus detection, the number of signals which are output by the pixels 100 is decreased. This enables the time for reading out signals from the pixels 100 to be reduced. Further, the image capture device according to the present embodiment outputs signals for focus detection from the second pixels and the third pixels. Therefore, focus detection may be performed by using signals which are output by the image capture device according to the present embodiment.

Thus, the image capture device according to the present embodiment may achieve higher-speed processing while suppressing a reduction in accuracy of focus detection.

In the image capture device according to the present embodiment, each of the multiple pixels 100 has photoelectric conversion elements at the first position and the second position. The image capture device described in PTL 3 is provided with a discharge region having a structure different from that of a photodiode. Thus, the image capture device described in PTL 3 is provided with a discharge region having a structure different from that of a photodiode. Thus, to achieve both of suppression of a reduction in accuracy of focus detection and absorption of a charge generated between a photodiode and a discharge region into the discharge region, the potential supplied to the discharge region is to be set differently from the potential supplied to the photodiode. In the image capture device according to the present embodiment, each of the multiple pixels 100 has photoelectric conversion elements at the first position and the second position. Thus, the same potential may be supplied to the photoelectric conversion element at the first position and that at the second position. Accordingly, setting of the potential of the discharge region which is to be performed in the image capture device described in PTL 3 does not need to be performed in the image capture device according to the present embodiment.

In the image capture device described in PTL 3, the potential of the discharge region is set lower than that of the photodiode. In this case, a charge generated in the photodiode may be absorbed into the discharge region. The absorption of the charge generated in the photodiode into the discharge region causes accuracy of focus detection to be reduced. In contrast, in the image capture device according to the present embodiment, a common reverse bias voltage is supplied to the photoelectric conversion elements at the first position and at the second position in each of the pixels 100. This causes a charge in the photoelectric conversion element at the first position to be hardly absorbed into the photoelectric conversion element at the second position in comparison with the image capture device described in PTL 3. Therefore, in the image capture device according to the present embodiment, a reduction in accuracy of focus detection hardly occurs.

In the image capture device described in PTL 3, a common voltage is supplied to the discharge region of each of the pixels. On the other hand, the photodiode of each of the pixels may have a depletion voltage varying depending on the pixel because non-uniformity occurs in the manufacturing process. Therefore, variation in the voltage difference between the discharge region and the photodiode occurs in the pixels. The variation in the voltage difference between the discharge region and the photodiode causes a reduction in accuracy of focus detection. Assume that a signal based on the charge in a photodiode at a first position in a certain pixel and a signal based on the charge of a photodiode at a second position in a different pixel are used to detect focus. In this case, when the voltage difference between the discharge region and the photodiode in the certain pixel is different from that in the different pixel, the degree at which a charge is hardly absorbed, in the photodiode at the first position in the certain pixel is different from that in the photodiode at the second position in the different pixel. Therefore, even when the same amount of light enters the photodiode at the first position in the certain pixel and the photodiode at the second position in the different pixel, a signal based on the photodiode at the first position in the certain pixel has a signal level different from that of a signal based on the photodiode at the second position in the different pixel. Therefore, when the voltage difference between the discharge region and the photodiode in the certain pixel is different from that in the different pixel, accuracy of focus detection is reduced. In contrast, in the image capture device according to the present embodiment, the second pixel and the third pixel which output signals for focus detection have a configuration in which a photoelectric conversion element which generates a charge for outputting a signal for focus detection has the same structure as that of another photoelectric conversion element. Multiple photoelectric conversion elements in the second pixel are closely disposed under the same microlens. Therefore, in the pixels 100 as a whole, even when non-uniformity in the photoelectric conversion elements occurs, since the photoelectric conversion elements in the second pixel are closely located, the non-uniformity is small. Similarly, in the photoelectric conversion elements in the third pixel, the non-uniformity is small. Therefore, even when non-uniformity in the photoelectric conversion elements occurs, the degree at which a charge is hardly absorbed from a photoelectric conversion element which generates a charge for outputting a signal for focus detection to another photoelectric conversion element may be easily made almost the same in the second pixel and the third pixel. Therefore, the image capture device according to the present embodiment enables a reduction in accuracy of focus detection to hardly occur.

Figure 10:
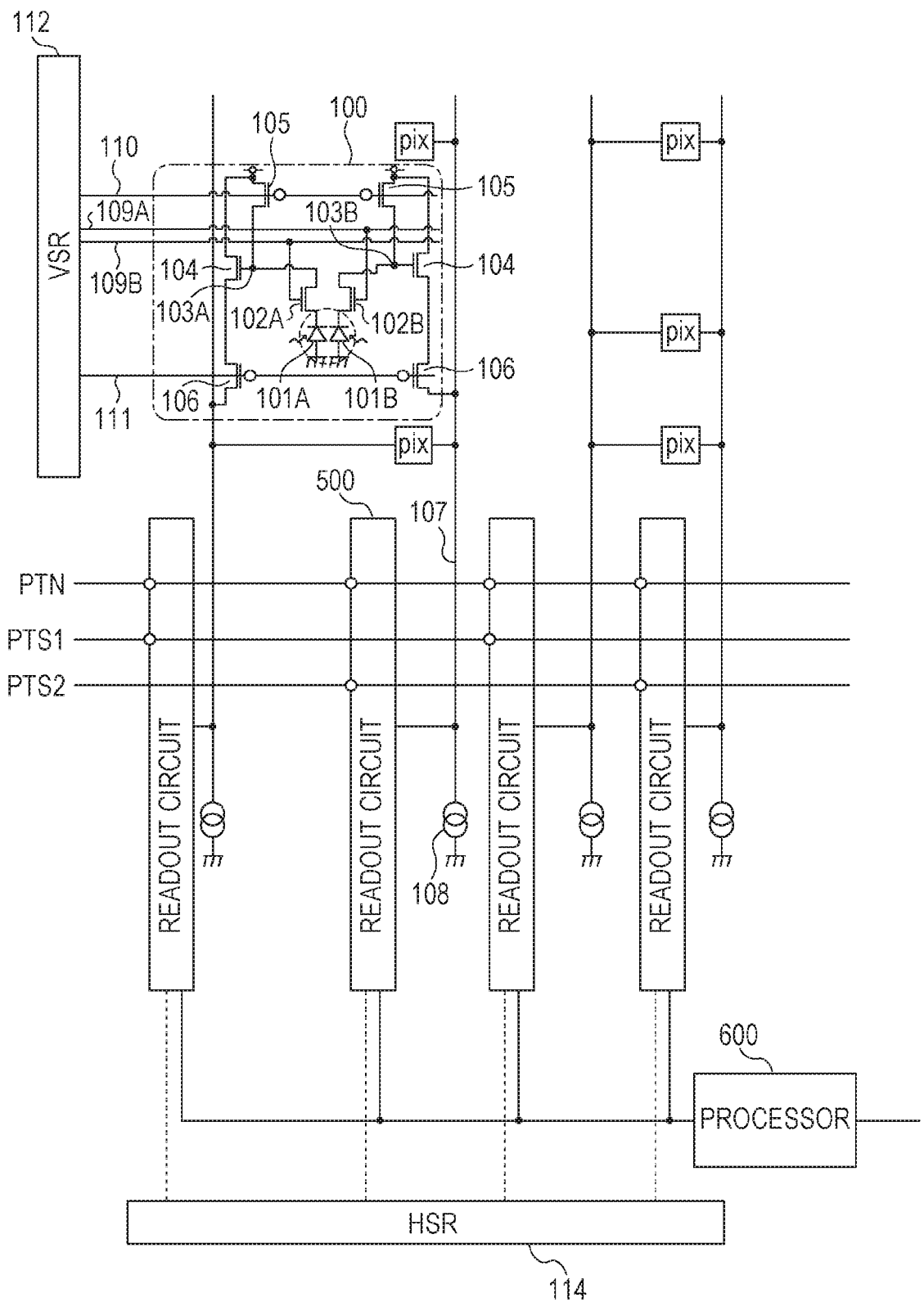
FIG. 10 is a diagram illustrating an exemplary configuration of an image capture device.

In the present embodiment, the example in which the pixel 100 has one amplifier transistor 104 is described. Another exemplary configuration may be employed in which, as illustrated in FIG. 10, the pixel 100 has multiple amplifier transistors 104 and in which the transfer transistor 102A and the transfer transistor 102B are connected to amplifier transistors 104 different from each other. In the image capture device in FIG. 10, two readout circuits 500 including a readout circuit 500 to which an A signal is output from a pixel 100 and a readout circuit 500 to which a B signal is output from a pixel 100 are provided for one pixel column. One readout circuit 500 receives a signal PTS1, and the other readout circuit 500 receives a signal PTS2. Each of the readout circuits 500 outputs an A signal or a B signal to a processor 600 through scanning performed by the horizontal scan circuit 114.

In the image capture device in FIG. 10, the operation performed by a pixel 100 which outputs a signal for image formation may be the same as that illustrated in FIG. 3B. The operation performed by a pixel 100 which does not output a B signal and which outputs an A signal may be the same as that illustrated in FIG. 3C. The operation performed by a pixel 100 which does not output an A signal and which outputs a B signal may be the same as that illustrated in FIG. 3D.

The processor 600 adds together an A signal and a B signal which are output from the readout circuits 500 corresponding to a pixel 100 which outputs a signal for image formation, and generates an (A+B) signal. The processor 600 outputs the (A+B) signal obtained through the addition, to the outside of the image capture device. In contrast, an A signal or a B signal which is output from a readout circuit 500 corresponding to a pixel 100 which outputs a signal for focus detection is output to the outside of the image capture device without addition.

Thus, in the image capture device in FIG. 10, in comparison with a case in which each of all of the pixels 100 outputs a signal for image formation and a signal for focus detection, the number of signals which are output by the image capture device is decreased. Thus, time for reading out signals from the image capture device may be reduced.

In the present embodiment, the example in which one pixel 100 has two photoelectric conversion elements 101 is described. However, more photoelectric conversion elements may be included. In this case, each of the first pixels outputs a signal based on the charge obtained by adding together the charge in all of the photoelectric conversion elements. Each of the second pixels which are some of the pixels other than the first pixels outputs a signal based on the charge in the photoelectric conversion element disposed at the first position, among the multiple photoelectric conversion elements. Each of the third pixels outputs a signal based on the charge in the photoelectric conversion element disposed at the second position which is different from the first position, among the multiple photoelectric conversion elements.

In the image capture device according to the present embodiment, a switching operation may be performed so that a pixel operates as either of the first pixel, the second pixel, and the third pixel for each vertical scanning period. For example, a pixel which operates as the first pixel for a first vertical scanning period may operate as the second pixel for a second vertical scanning period. A pixel which operates as the second pixel for the first vertical scanning period may operate as the first pixel for the second vertical scanning period.

A pixel which operates as the second pixel and a pixel which operates as the third pixel may be selected as appropriate in accordance with the position of a ranging point which is used. In addition, the horizontal scan circuit 114 may perform a thinning out operation of reading out signals only from some of the readout circuits 500. Thus, for example, in the operation in FIG. 3A, among the pixels 100 in the (N+1)th row and the (N+2)th row, signals which are generated only from some of the pixels 100 and which correspond to the position of a ranging point which is used may be output to the outside of the image capture device. Thus, focus detection according to the position of the ranging point which is used and a reduction in a horizontal scanning period for readout of signals from the pixels 100 in the (N+1)th row and the (N+2)th row may be achieved.

Second Embodiment

The image capture device according to the present embodiment will be described by focusing on points in which the present embodiment is different from the first embodiment.

The configuration of a pixel 100 in the image capture device according to the present embodiment and the configuration of the image capture device are the same as those in the image capture device according to the first embodiment. A point in which the image capture device according to the first embodiment is different from that according to the present embodiment is that a pixel 100 which performs the operation in FIG. 3C or 3D continues to reset a photoelectric conversion element whose charge is not read to the input node 103 in one vertical scanning period, during a period in which the signal PRES is at the high level.

Figure 4:
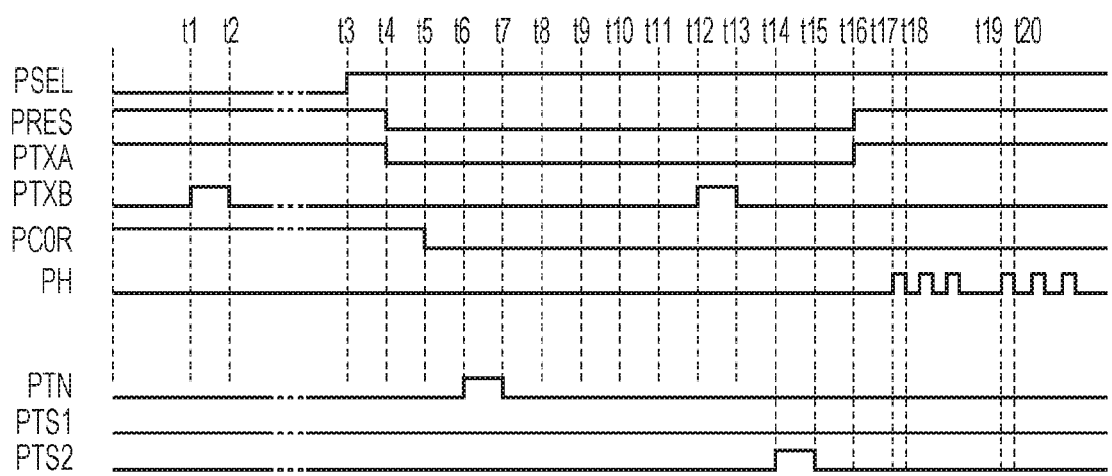
FIG. 4 is a diagram illustrating an exemplary operation of an image capture device.

FIG. 4 is a diagram illustrating the operation according to the present embodiment which is performed by a pixel 100 that does not output a signal based on the charge in the photoelectric conversion element 101A and that outputs a signal based on the charge in the photoelectric conversion element 101B. Points in which the operation illustrated in FIG. 4 is different from that illustrated in FIG. 3D will be mainly described below.

In the operation illustrated in FIG. 4, the vertical scan circuit 112 makes a period in which the signal PRES is at the high level match a period in which the signal PTXA is at the high level. Thus, the photoelectric conversion element 101A is reset over the entire period in which the signal PRES is at the high level. In the operation illustrated in FIG. 3D, the period in which the charge in the photoelectric conversion element 101A is reset is only the period from the time t1 to the time t2. For example, under a condition in which a strong light enters the photoelectric conversion element 101A, a large amount of charge is generated in the photoelectric conversion element 101A. In this case, the charge accumulated in the photoelectric conversion element 101A may leak into the input node 103. Thus, the input node 103 has a potential obtained by adding the charge in the photoelectric conversion element 101B to the charge leaking from the photoelectric conversion element 101A. Therefore, accuracy of a signal which is output by the pixel 100 is decreased. In contrast, in the image capture device according to the present embodiment, the photoelectric conversion element 101A is reset over the entire period in which the signal PRES is at the high level. Thus, even when a strong light enters the photoelectric conversion element 101A, a leakage of charge from the photoelectric conversion element 101A to the input node 103 may be decreased.

In the present embodiment, the operation which is performed by a pixel 100 that does not output a signal based on the charge in the photoelectric conversion element 101A and that outputs a signal based on the charge in the photoelectric conversion element 101B is described. The operation according to the present embodiment may be applied to a pixel 100 that, like the operation in FIG. 3C, does not output a signal based on the charge in the photoelectric conversion element 101B and that outputs a signal based on the charge in the photoelectric conversion element 101A. That is, the vertical scan circuit 112 may make a period in which the signal PRES is at the high level match a period in which the signal PTXB is at the high level. Thus, in a pixel 100 which does not output a signal based on the charge in the photoelectric conversion element 101B and which outputs a signal based on the charge in the photoelectric conversion element 101A, a leakage of charge from the photoelectric conversion element 101B to the input node 103 may be also decreased.

As described above, the image capture device according to the present embodiment enables a leakage of charge from a photoelectric conversion element whose charge is not read in one vertical scanning period to be decreased. Thus, the image capture device according to the present embodiment enables accuracy of a signal which is output by a pixel 100 including a photoelectric conversion element whose charge is not read in one vertical scanning period to be improved.

Third Embodiment

The image capture device according to the present embodiment will be described by focusing on points in which the present embodiment is different from the first embodiment. The configurations of a pixel 100 and the image capture device are the same as those in the first embodiment.

Figure 5:
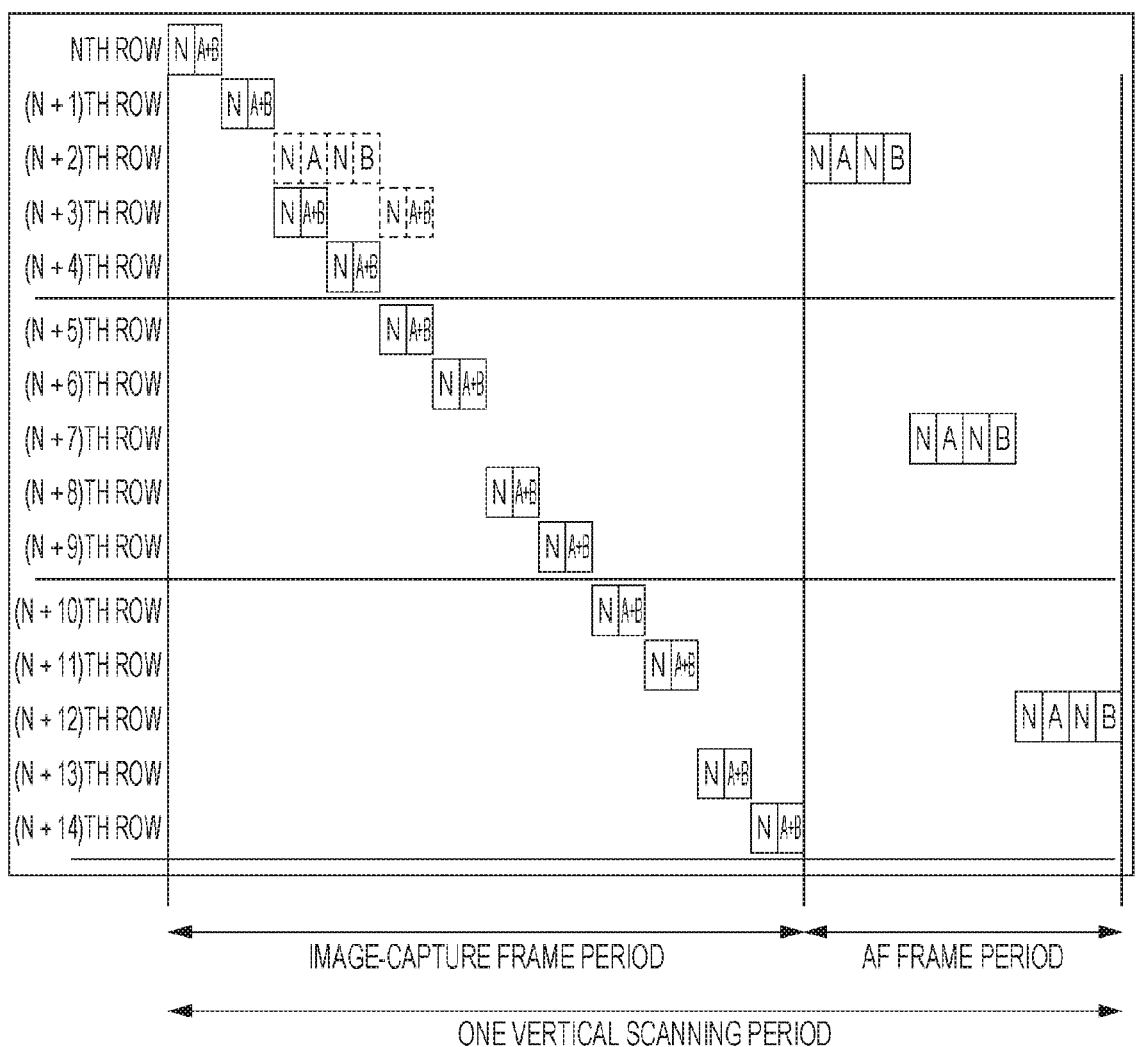
FIG. 5 is a diagram illustrating an exemplary operation of an image capture device.

FIG. 5 is a diagram illustrating the operation performed by the image capture device according to the present embodiment. In the (N+2)th row and the (N+3)th row in FIG. 5, the operations illustrated by using a dashed line are different from the operation according to the present embodiment. One vertical scanning period in which the vertical scan circuit 112 scans multiple pixels 100 includes an image-capture frame period and an AF frame period. In an image-capture frame period, a pixel 100 in the pixel rows excluding the (N+2)th row, the (N+7)th row, and the (N+12)th row among the Nth row to the (N+14)th row outputs an N signal and an (A+B) signal. After a pixel 100 in the (N+14)th row outputs an (A+B) signal, the vertical scan circuit 112 selects the (N+2)th pixel row. Thus, a pixel 100 in the (N+2)th pixel row sequentially outputs an N signal, an A signal, an N signal, and a B signal. This operation is also performed in each of the (N+7)th pixel row and the (N+12)th pixel row.

Figure 6A:
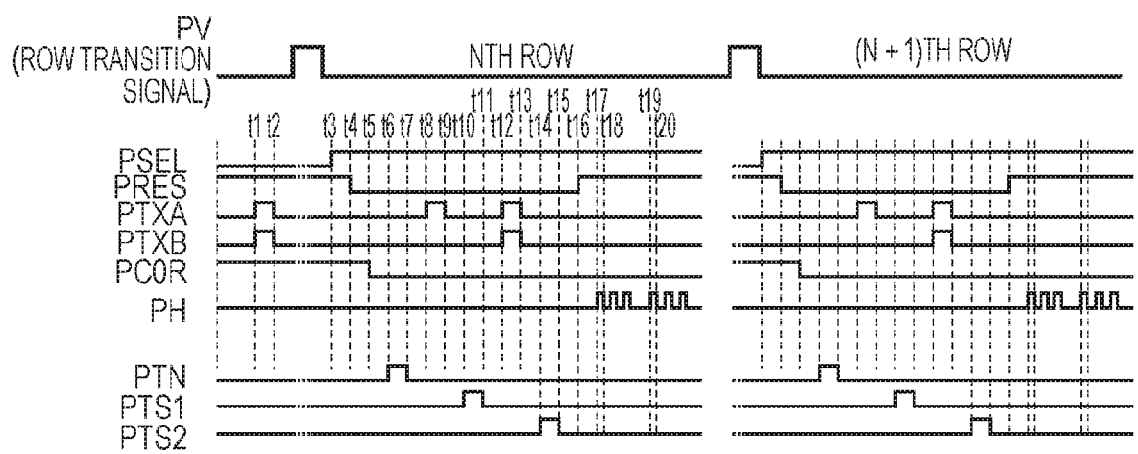
FIG. 6A includes a diagram illustrating exemplary operations of an image capture device.

FIG. 6A is a diagram illustrating the operation performed by pixels 100 in the Nth row and the (N+1)th row illustrated in FIG. 5. A signal PV illustrated in FIG. 6A is a row transition signal. When the signal PV is set to the high level, the vertical scan circuit 112 selects another pixel row. As illustrated in FIG. 6A, a pixel 100 in the Nth row outputs an N signal and an (A+B) signal. After that, when the signal PV is set to the high level, a pixel 100 in the (N+1)th row outputs an N signal and an (A+B) signal.

Figure 6B:
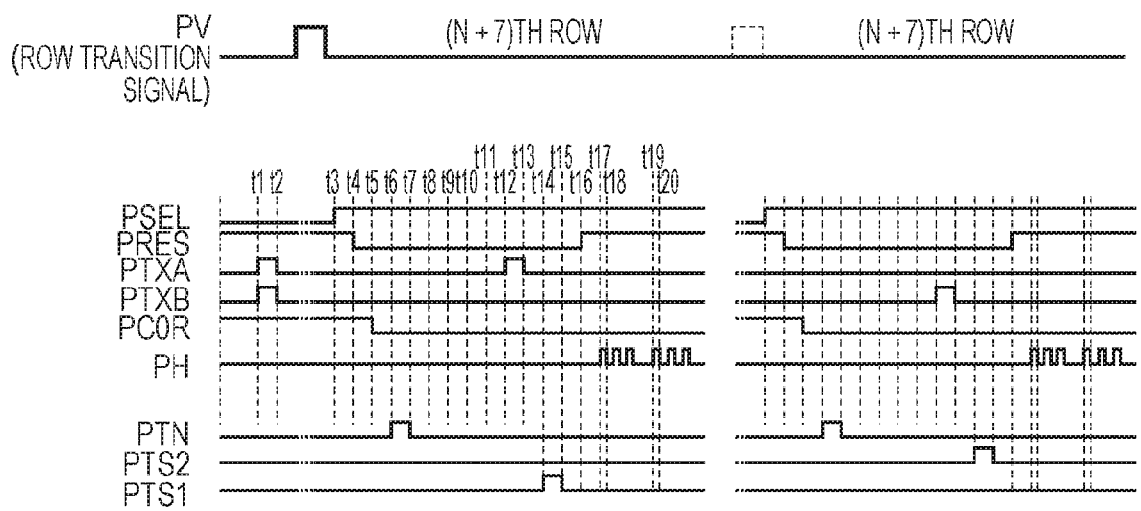
FIG. 6B includes a diagram illustrating exemplary operations of the image capture device.

FIG. 6B illustrates the operation which is performed by a pixel 100 in the (N+7)th row and which is illustrated in FIG. 5. As illustrated in FIG. 6B, the pixel 100 in the (N+7)th row outputs an N signal and an A signal. After that, the signal PV is kept at the low level. Then, the pixel 100 in the (N+7)th row outputs an N signal and a B signal. Therefore, the period in which the pixel 100 in the (N+7)th row illustrated in FIG. 6B is selected by the vertical scan circuit 112 is longer than that in which the pixel 100 in the Nth row is selected by the vertical scan circuit 112 because the number of signals which are output in the former period is larger than that in the latter period.

In the image capture device according to the present embodiment, a period in which signals for image formation are output is different from a period in which signals for focus detection are output. An effect which results from this and which is obtained by the image capture device according to the present embodiment will be described. As described by using FIGS. 5, 6A, and 6B, the period in which a pixel row outputting a signal for focus detection is selected by the vertical scan circuit 112 is longer than that in which a pixel row outputting a signal for image formation is selected by the vertical scan circuit 112. An operation in which the vertical scan circuit 112 sequentially selects the Nth row to the (N+14)th row without dividing one vertical scanning period into an image-capture frame period and an AF frame period will be described as an operation different from that according to the present embodiment. In this case, when the (N+2)th row and the (N+3)th row are focused, the operation illustrated by using a dashed line in FIG. 5 is performed. Thus, the time difference between the start time of selection of the pixel 100 in the (N+1)th row and that in the (N+3)th row is larger than that between the start time of selection of the pixel 100 in the Nth row and that in the (N+1)th row. Therefore, distortion of a subject image in the (N+1)th row and the (N+3)th row may be large in an image formed by using signals for image formation. In contrast, in the image capture device according to the present embodiment, since an image-capture frame period and an AF frame period are differently set, the time difference between the start time of selection of the pixel 100 in the Nth row and that in the (N+1)th row is equal to that between the start time of selection of the pixel 100 in the (N+1)th row and that in the (N+3)th row. Thus, in comparison with the different operation described above, the image capture device according to the present embodiment enables distortion of a subject image to be reduced in an image formed by using signals for image formation.

In the image capture device according to the present embodiment, an image-capture frame period in which signals for image formation are output and an AF frame period in which signals for focus detection are output are differently set. Accordingly, the image capture device according to the present embodiment enables a signal processing operation performed by a signal processor which processes signals that are output by the image capture device and which is provided on the outside of the image capture device to be easily performed in comparison with a case in which the image capture device outputs signals for image formation and signals for focus detection in a mixed manner.

In the present embodiment, an AF frame period is provided after an image-capture frame period. This order may be reversed.

Fourth Embodiment

The image capture device according to the present embodiment will be described by focusing on points in which the present embodiment is different from the first embodiment.

Figure 7A:
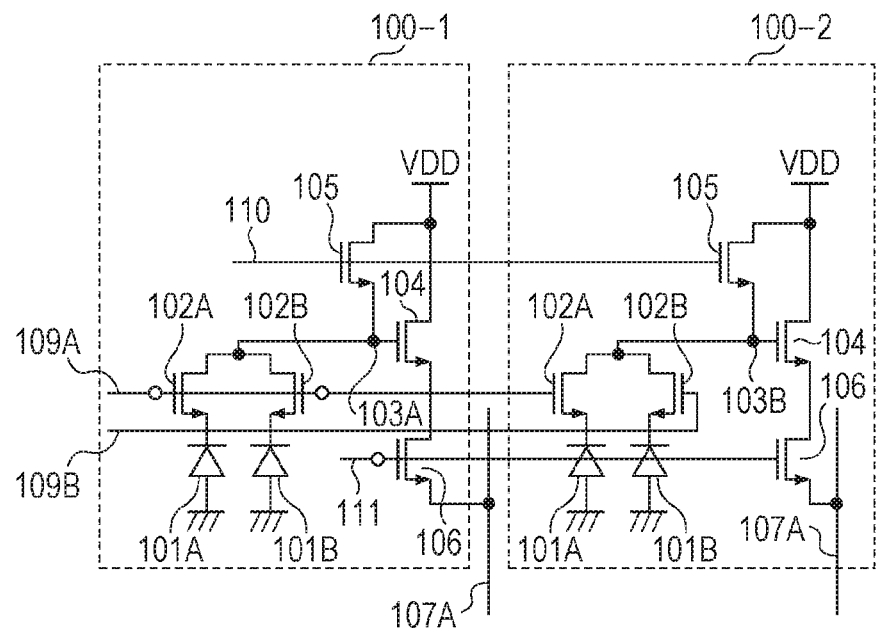
FIG. 7A includes a diagram illustrating exemplary pixels.

FIG. 7A is a circuit diagram of pixels 100 according to the present embodiment. FIG. 7A illustrates two pixels 100-1 and 100-2 belonging to the same row. In FIG. 7A, components having the same functions as those in FIGS. 1A and 1B are designated with the same reference numerals as those in FIG. 1A.

In the pixel 100-1, the transfer control line 109A is connected to both of the gate of the transfer transistor 102A and that of the transfer transistor 102B. In the pixel 100-2, the transfer control line 109A is connected to the gate of the transfer transistor 102A, and the transfer control line 109B is connected to the gate of the transfer transistor 102B.

Figure 7B:
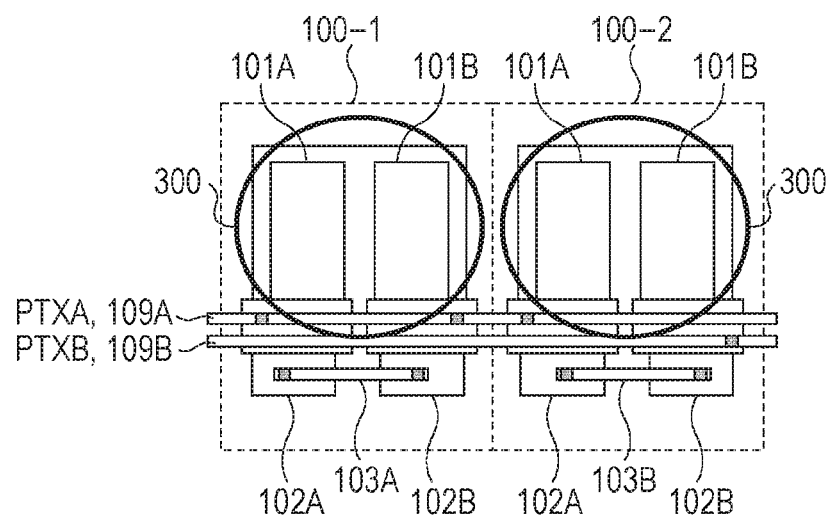
FIG. 7B includes a plan view of pixels.

FIG. 7B is a plan view of the pixel 100-1 and the pixel 100-2 including the circuit illustrated in FIG. 7A. In FIG.

7B, components having the same functions as those in FIGS. 1A and 1B are designated with the same reference numerals as those in FIG. 1B.

The pixel 100-1 and the pixel 100-2 illustrated in FIG. 7A are driven in the same way as that illustrated in FIG. 6B. When the vertical scan circuit 112 sets the signal PTXA which is output to the transfer control line 109A, to the high level, the charge obtained by adding the charge in the photoelectric conversion element 101A and that in the photoelectric conversion element 101B together is transferred to the input node 103A in the pixel 100-1. In contrast, in the pixel 100-2, the charge in the photoelectric conversion element 101A is transferred to the input node 103B. Thus, the pixel 100-1 outputs an (A+B) signal, and the pixel 100-2 outputs an A signal. When the vertical scan circuit 112 sets the signal PTXB which is output to the transfer control line 109B, to the high level, the charge in the photoelectric conversion element 101B is transferred to the input node 103B in the pixel 100-2. Thus, the pixel 100-2 outputs a B signal.

Thus, in the image capture device according to the present embodiment, each of the pixels 100 located in the same row has a different type of connection of transfer transistors to the transfer control line 109A. This enables a signal which is output by a pixel 100 when the vertical scan circuit 112 sets the signal PTXA to the high level, to be either of an A signal and an (A+B) signal.

The configuration of the pixel 100-1 and the pixel 100-2 illustrated in FIGS. 7A and 7B is exemplary. An example of another image capture device will be described. Both of the gates of the transfer transistor 102A and the transfer transistor 102B of the pixel 100-1 may be connected to the transfer control line 109B, and the transfer transistor 102B of the pixel 100-2 may be connected to the transfer control line 109B. The operation in this case may be the same as the operation illustrated in FIG. 6B.

Fifth Embodiment

The image capture device according to the present embodiment will be described by focusing on points in which the present embodiment is different from the fourth embodiment.

The image capture device according to the present embodiment which has the configuration of the image capture device according to the fourth embodiment continues to reset the charge in the photoelectric conversion element 101B of the pixel 100-2 for the period in which the signal PRES is at the high level. That is, in the operation illustrated in FIG. 6B, the period in which the signal PRES is at the high level is the same as the period in which the signal PTXB is at the high level. Thus, as described in the second embodiment, a leakage of charge in the photoelectric conversion element 101B to the input node 103B which occurs when the charge in the photoelectric conversion element 101A is transferred to the input node 103B may be decreased in the pixel 100-2.

Sixth Embodiment

The image capture device according to the present embodiment will be described by focusing on points in which the present embodiment is different from the fifth embodiment.

FIGS. 8A to 8G include plan views of pixels in the image capture device according to the present embodiment. In FIGS. 8A to 8G, the microlens 300 is not illustrated, and the reference numerals of the transfer transistor 102A and the transfer transistor 102B are not given. In a pixel in FIGS. 8A to 8G, the arrangement of the microlens 300, the transfer transistor 102A, and the transfer transistor 102B is the same as that illustrated in FIG. 7B.

As described in the fifth embodiment, the operation of pixels illustrated in FIGS. 8A to 8G is an operation obtained by changing the operation in FIG. 6B so that a period in which the signal PRES is at the high level is the same as a period in which the signal PTXB is at the high level. As illustrated in FIGS. 8A to 8F, in the image capture device according to the present embodiment, each of the pixels has a different type of connection of transfer transistors to the transfer control line 109A and the transfer control line 109B. The image capture device according to the present embodiment has a configuration in which multiple rows of pixel 100 which are pixel rows illustrated in FIGS. 8A to 8F are arranged in a mixed manner. Thus, without changing control of pulses of the signal PTXA and the signal PTXB for each pixel row, a different combination of output signals may be obtained for each pixel row.

Figure 8A:
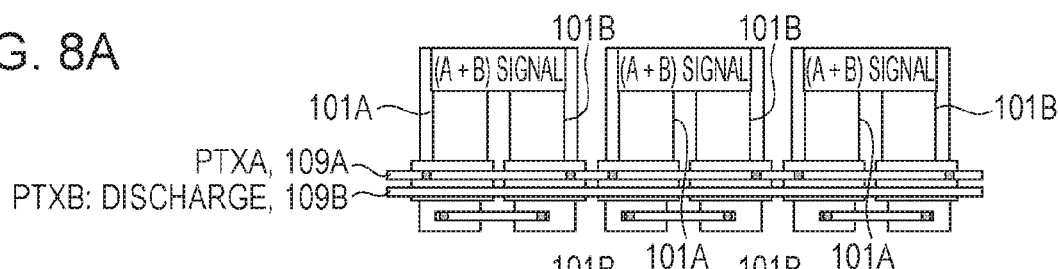
FIG. 8A includes a plan view of pixels.
Figure 8B:
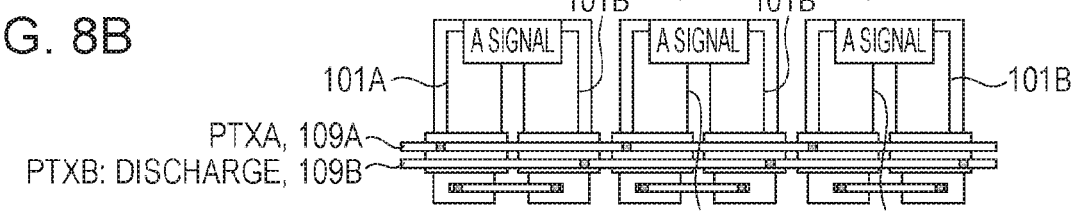
FIG. 8B includes a plan view of pixels.
Figure 8C:
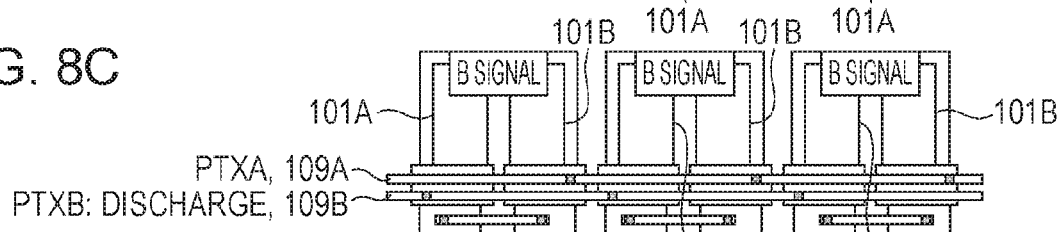
FIG. 8C includes a plan view of pixels.
Figure 8D:
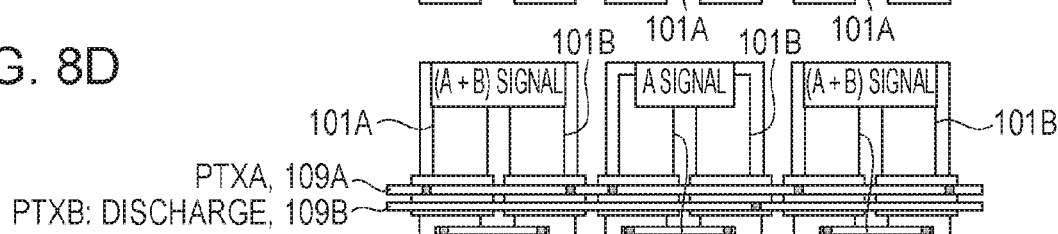
FIG. 8D includes a plan view of pixels.
Figure 8E:
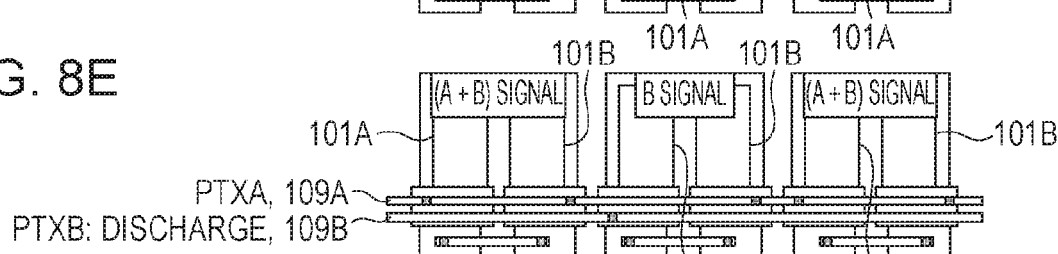
FIG. 8E includes a plan view of pixels.
Figure 8F:
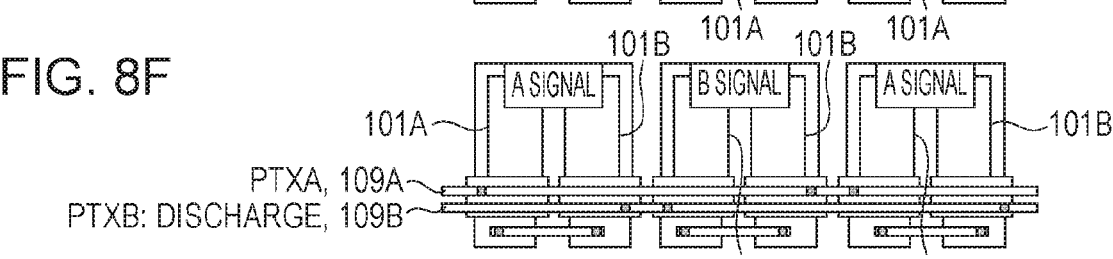
FIG. 8F includes a plan view of pixels.
Figure 8G:
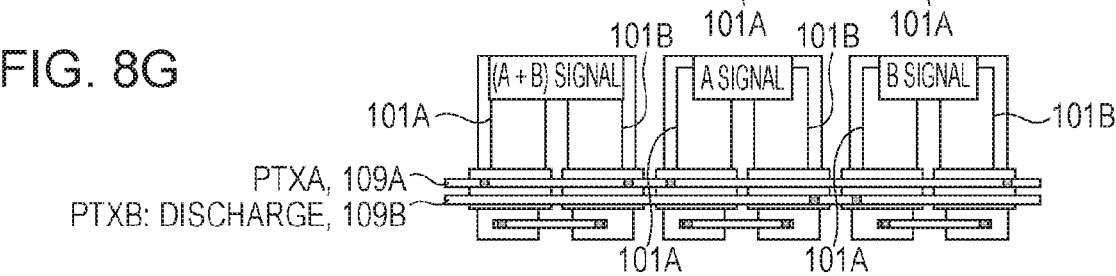
FIG. 8G includes a plan view of pixels.

In the case of the image capture device illustrated in FIG. 10, the pixel rows illustrated in FIGS. 8B, 8C, and 8F may be individually used or more than one of the pixel rows may be combined together and used. In FIGS. 8B, 8C, and 8D, a common input node 103 is connected to the transfer transistor 102A and the transfer transistor 102B. When this is applied to the image capture device in FIG. 10, the transfer transistor 102A and the transfer transistor 102B are connected to input nodes 103 which are different from each other.

Seventh Embodiment

The image capture device according to the present embodiment will be described by focusing on points in which the present embodiment is different from the sixth embodiment.

Figure 9:
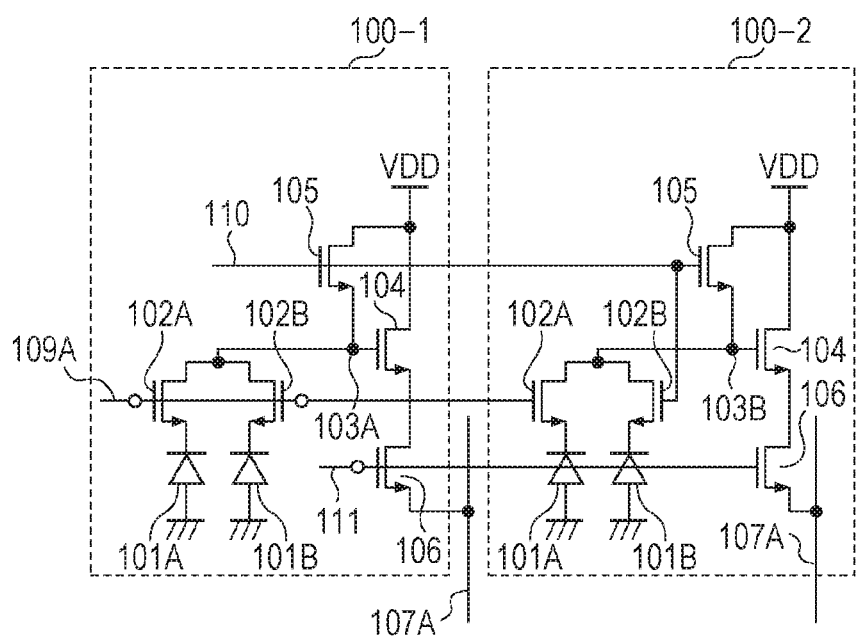
FIG. 9 is a diagram illustrating exemplary pixels.

FIG. 9 is a circuit diagram of a pixel 100-1 and a pixel 100-2 of the image capture device according to the present embodiment. In the image capture device according to the present embodiment, the gate of the transfer transistor 102B of the pixel 100-2 which outputs an A signal is connected to the reset control line 110. A pixel row in which the pixel 100-1 and the pixel 100-2 are disposed is not provided with the transfer control line 109B. The operation of the pixel row including the pixel 100-1 and the pixel 100-2 in FIG. 9 is the same as the operation in FIG. 6B except that the signal PTXB is not supplied to the pixel 100-1 and the pixel 100-2. In the pixel 100-2 in FIG. 9, the charge in the photoelectric conversion element 101B is also reset for the period in which the signal PRES is at the high level. Thus, the image capture device according to the present embodiment may also obtain the same effect as that in the image capture device according to the sixth embodiment. In addition, in the image capture device according to the present embodiment, a pixel row which is not provided with the transfer control line 109B may be disposed. A decrease in the number of wiring lines in the image capture device may achieve a wider range of choices about layout of the image capture device and an effect of a reduction in cost of manufacturing.

Eighth Embodiment

Figure 11:
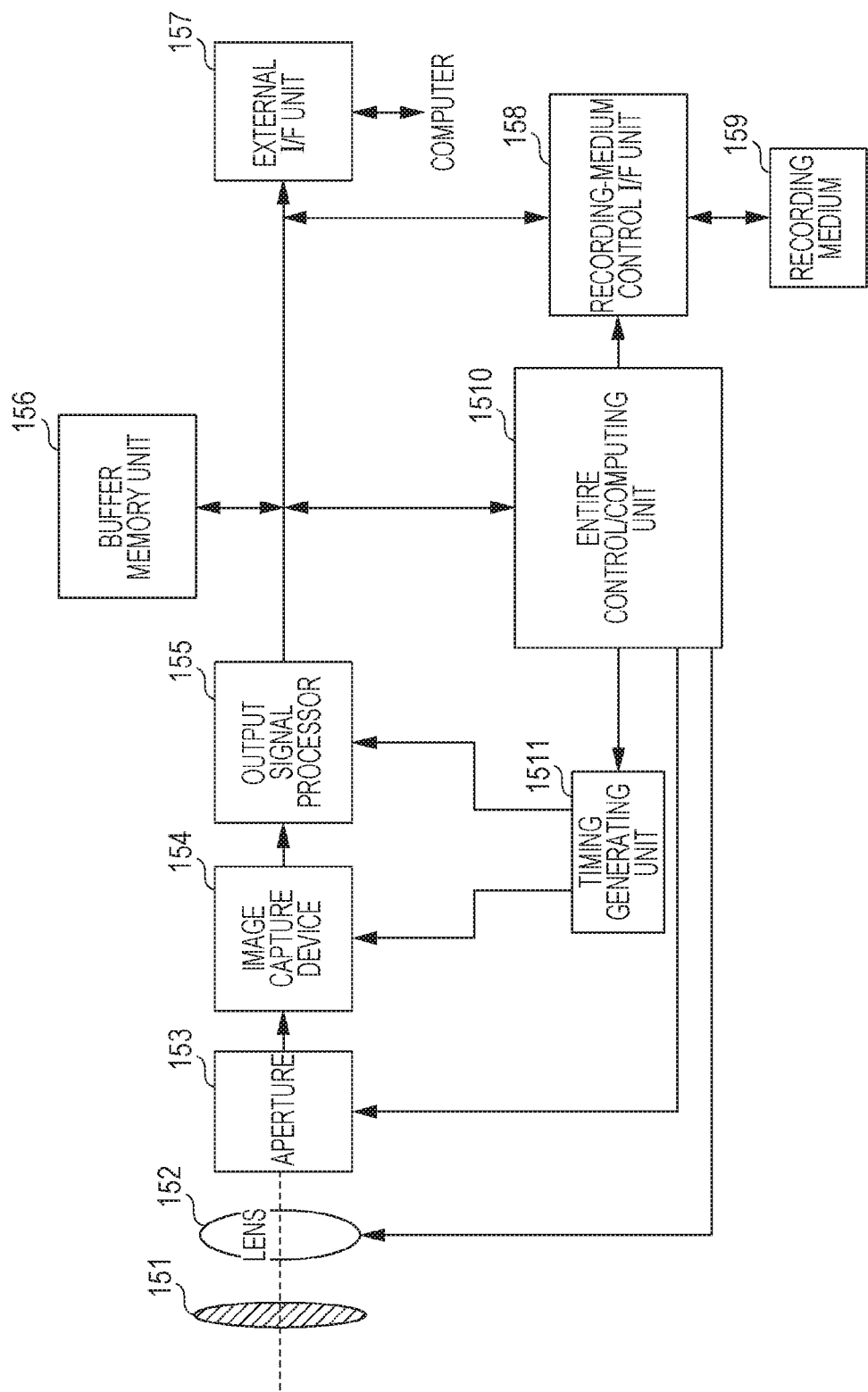
FIG. 11 is a diagram illustrating an exemplary image capture system.

An embodiment obtained when the image capture device described in the first to seventh embodiments is applied to an image capture system will be described. Examples of an image capture system include a digital still camera, a digital camcorder, and a monitoring camera. FIG. 11 is a schematic diagram obtained when the image capture device is applied to a digital still camera serving as an exemplary image capture system.

The image capture system illustrated in FIG. 11 includes a barrier 151 for protecting a lens, a lens 152 for forming an optical image of a subject on an image capture device 154, and an aperture 153 for varying the amount of light passing through the lens 152. The lens 152 and the aperture 153 form an optical system which collects light on the image capture device 154. The image capture system illustrated in FIG. 11 includes an output signal processor 155 which processes an output signal which is output from the image capture device 154.

The output signal processor 155 performs AD conversion of converting a signal which is output by the image capture device 154 into a digital signal. In addition, the output signal processor 155 performs various types of correction and compression on a signal if necessary, and outputs the signal.

The image capture system illustrated in FIG. 11 also includes a buffer memory unit 156 for temporarily storing image data, and an external interface unit 157 for communicating with an external computer or the like. The image capture system further includes a removable recording medium 159 such as a semiconductor memory for recording or reading image capture data, and a recording-medium control interface unit 158 for recording or reading data in the recording medium 159. The image capture system further includes an entire control/computing unit 1510 which performs various types of calculation and which controls the entire digital still camera, and a timing generating unit 1511 which outputs various timing signals to the image capture device 154 and the output signal processor 155. The timing signal or the like may be received from the outside. The image capture system may include at least the image capture device 154 and the output signal processor 155 which processes an output signal which is output from the image capture device 154.

The image capture device 154 outputs an A signal, a B signal, and an (A+B) signal. The output signal processor 155 performs AD conversion on each signal to obtain a digital signal. A signal obtained by performing AD conversion on an A signal is a digital A signal. A signal obtained by preforming AD conversion on a B signal is a digital B signal. A signal obtained by performing AD conversion on an (A+B) signal is a digital (A+B) signal.

The output signal processor 155 uses digital A signals and digital B signals to detect focus by using a phase difference detection method. In addition, the output signal processor 155 uses digital (A+B) signals to form an image.

As described above, the image capture system according to the present embodiment is capable of performing a focus detection operation and an image capture operation of forming an image, by applying the image capture device 154.

In the present embodiment, the example in which the output signal processor 155 performs AD conversion is described. Another example is that a readout circuit which is provided corresponding to a column including pixels 100 may perform AD conversion in the image capture device 154. In this case, since a signal which is output by the image capture device 154 is a digital signal, no AD conversion operations may be performed in the output signal processor 155. In this case, the output signal processor 155 uses digital signals which are output from the image capture device 154 to detect focus and capture an image.

The above-described embodiments are merely exemplary embodiments used when the present invention is embodied. These embodiments should not be used to restrictively interpret the technical scope of the present invention. That is, without departing from the technical concept or main characteristics of the present invention, the present invention may be embodied in various forms. The embodiments described above may be combined together and carried out.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of International Patent Application No. PCT/JP2014/084603, filed Dec. 26, 2014, which is hereby incorporated by reference herein in its entirety.

What is claimed is:

1. A method for driving an image capture device including a plurality of pixels, each of the plurality of pixels including a microlens and a plurality of photoelectric conversion elements, the plurality of photoelectric conversion elements generating respective charges based on light passing through the microlens and being disposed at a first position and a second position with respect to the microlens in such a manner as to receive light passing through different respective pupils in an optical system, the pupils being different from each other, the method comprising:

supplying a common voltage to the plurality of photoelectric conversion elements such that the plurality of photoelectric conversion elements are depleted;

in one vertical scanning period in which rows in which the plurality of pixels are arranged are vertically scanned, by using a first pixel, outputting a signal based on charges obtained by adding together the charges generated by the plurality of photoelectric conversion elements;

by using a second pixel, outputting a signal based on charges generated by the photoelectric conversion element disposed at the first position among the plurality of photoelectric conversion elements, without outputting a signal based on charges generated by the photoelectric conversion element disposed at the second position among the plurality of photoelectric conversion elements; and by using a third pixel, outputting a signal based on charges generated by the photoelectric conversion element disposed at the second position among the plurality of photoelectric conversion elements, without outputting a signal based on charges generated by the photoelectric conversion element disposed at the first position among the plurality of photoelectric conversion elements.

2. The method according to claim 1,
wherein each of the plurality of pixels includes an amplifier unit which outputs a signal based on charges generated by each of the plurality of photoelectric conversion elements.

3. The method according to claim 1,
wherein, in the second pixel, the photoelectric conversion element disposed at the second position is reset for a period in which the photoelectric conversion element disposed at the first position accumulates the charges.

4. The method according to claim 3,
wherein, in the third pixel, the photoelectric conversion element disposed at the first position is reset for a period in which the photoelectric conversion element disposed at the second position accumulates the charges.

5. The method according to claim 1,
wherein the plurality of pixels are arranged in a matrix,
wherein the second pixel and the third pixel are arranged in an identical row, and
wherein, after the second pixel outputs the signal, the third pixel outputs the signal.

6. The method according to claim 1,
wherein the plurality of pixels are arranged in a matrix,
wherein the second pixel and the third pixel are arranged in an identical row, and
wherein a period in which the second pixel outputs the signal overlaps a period in which the third pixel outputs the signal.

7. The method according to claim 5,
wherein the first pixel is arranged in the identical row in which the second pixel and the third pixel are arranged, and
wherein the signals are output in the order of the first pixel, the second pixel, and the third pixel.

8. The method according to claim 6,
wherein the first pixel is arranged in the identical row in which the second pixel and the third pixel are arranged, and
wherein a period in which the first pixel outputs the signal, the period in which the second pixel outputs the signal, and the period in which the third pixel outputs the signal overlap one another.

9. The method according to claim 1,
wherein the plurality of pixels are arranged in a matrix, and
wherein one vertical scanning period includes a frame in which a first row is scanned and in which a second row is not scanned, and a frame in which the second row is scanned and in which the first row is not scanned, the first row being a row in which the first pixel is arranged, the second row being a row in which the second pixel and the third pixel are arranged.

10. The method according to claim 1,
wherein a pixel which operates as the first pixel in a first vertical scanning period in which the rows in which the plurality of pixels are arranged are vertically scanned operates as the second pixel in a second vertical scanning period in which the rows in which the plurality of pixels are arranged are vertically scanned, and
wherein a pixel which operates as the second pixel in the first vertical scanning period operates as the first pixel in the second vertical scanning period.

11. An image capture device comprising:
a plurality of pixels, each of the plurality of pixels including a microlens and a plurality of photoelectric conversion elements, the plurality of photoelectric conversion elements generating respective charges based on light passing through the microlens and being disposed at a first position and a second position with respect to the microlens in such a manner as to receive light passing through respective pupils in an optical system, the pupils being different from each other,
wherein a common voltage is supplied to the plurality of photoelectric conversion elements in each of the plurality of pixels such that the plurality of photoelectric conversion elements are depleted,
wherein a first pixel outputs a signal based on charges obtained by adding together the charges generated by the plurality of photoelectric conversion elements,
wherein a second pixel outputs a signal based on charges generated by the photoelectric conversion element disposed at the first position among the plurality of photoelectric conversion elements, without outputting a signal based on charges generated by the photoelectric conversion element disposed at the second position among the plurality of photoelectric conversion elements, and
wherein, in one vertical scanning period in which rows in which the plurality of pixels are arranged are vertically scanned, a third pixel outputs a signal based on charges generated by the photoelectric conversion element disposed at the second position among the plurality of photoelectric conversion elements, without outputting a signal based on charges generated by the photoelectric conversion element disposed at the first position among the plurality of photoelectric conversion elements.

12. The image capture device according to claim 11,
wherein each of the plurality of pixels includes an amplifier unit, a first transfer transistor that transfers the charges in the photoelectric conversion element disposed at the first position to the amplifier unit, and a second transfer transistor that transfers the charges in the photoelectric conversion element disposed at the second position to the amplifier unit, and
wherein a gate of the first transfer transistor of the first pixel, a gate of the second transfer transistor of the second pixel, and a gate of the first transfer transistor of the second pixel are connected to an identical control line.

13. The image capture device according to claim 12,
wherein the gate of the first transfer transistor of the first pixel, the gate of the second transfer transistor of the second pixel, and a gate of the second transfer transistor of the third pixel are connected to an identical control line.

14. An image capture system comprising:
an image capture device; and
an output signal processor that processes a signal which is output by the image capture device,
wherein the image capture device includes a plurality of pixels, each of the plurality of pixels including a microlens and a plurality of photoelectric conversion elements, the plurality of photoelectric conversion elements generating respective charges based on light passing through the microlens and being disposed at a first position and a second position with respect to the microlens in such a manner as to receive light passing through respective pupils in an optical system, the pupils being different from each other,
wherein a common voltage is supplied to the plurality of photoelectric conversion elements such that the plurality of photoelectric conversion elements are depleted,
wherein a first pixel outputs a signal based on charges obtained by adding together the charges generated by the plurality of photoelectric conversion elements,
wherein a second pixel outputs a signal based on charges generated by the photoelectric conversion element disposed at the first position among the plurality of photoelectric conversion elements, without outputting a signal based on charges generated by the photoelectric conversion element disposed at the second position among the plurality of photoelectric conversion elements,
wherein, in one vertical scanning period in which rows in which the plurality of pixels are arranged are vertically scanned, a third pixel outputs a signal based on charges generated by the photoelectric conversion element disposed at the second position among the plurality of photoelectric conversion elements, without outputting a signal based on charges generated by the photoelectric conversion element disposed at the first position among the plurality of photoelectric conversion elements, wherein the output signal processor detects focus based on the signals which are output by the second pixel and the third pixel, and wherein the output signal processor forms an image based on the signal which is output by the first pixel.

15. The image capture system according to claim 14, wherein each of the plurality of pixels includes an amplifier unit which outputs a signal based on charges generated by each of the plurality of photoelectric conversion elements.

16. The image capture system according to claim 14, wherein, in the second pixel, the photoelectric conversion element disposed at the second position is reset for a period in which the photoelectric conversion element disposed at the first position accumulates the charges.

17. The image capture system according to claim 14, wherein the plurality of pixels are arranged in a matrix, wherein the second pixel and the third pixel are arranged in an identical row, and wherein, after the second pixel outputs the signal, the third pixel outputs the signal.

18. The image capture system according to claim 14, wherein the plurality of pixels are arranged in a matrix, wherein the second pixel and the third pixel are arranged in an identical row, and wherein a period in which the second pixel outputs the signal overlaps a period in which the third pixel outputs the signal.

19. The image capture system according to claim 14, wherein the plurality of pixels are arranged in a matrix, and wherein one vertical scanning period includes a frame in which a first row is scanned and in which a second row is not scanned, and a frame in which the second row is scanned and in which the first row is not scanned, the first row being a row in which the first pixel is arranged, the second row being a row in which the second pixel and the third pixel are arranged.

20. The image capture system according to claim 14, wherein a pixel which operates as the first pixel in a first vertical scanning period in which the rows in which the plurality of pixels are arranged are vertically scanned operates as the second pixel in a second vertical scanning period in which the rows in which the plurality of pixels are arranged are vertically scanned, and wherein a pixel which operates as the second pixel in the first vertical scanning period operates as the first pixel in the second vertical scanning period.

* * * * *